US006532838B1

(12) United States Patent  (10) Patent No.: US 6,532,838 B1
Cates  (45) Date of Patent: Mar. 18, 2003

(54) METHOD AND APPARATUS FOR DETECTING, MEASURING, CONCENTRATING AND SUPPRESSING SUBTERRANEAN TERMITES

(75) Inventor: Jerry Cates, Round Rock, TX (US)

(73) Assignee: EntomoBiotics, Inc., Round Rock, TX (US)

( * ) Notice: Subject to any disclaimer, the term of this patent is extended or adjusted under 35 U.S.C. 154(b) by 0 days.

(21) Appl. No.: 09/507,271

(22) Filed: Feb. 18, 2000

Related U.S. Application Data

(63) Continuation-in-part of application No. 09/441,618, filed on Nov. 16, 1999, now Pat. No. 6,189,393, which is a continuation-in-part of application No. 09/434,091, filed on Nov. 5, 1999, now Pat. No. 6,439,069, which is a continuation-in-part of application No. 09/253,493, filed on Feb. 19, 1999, now Pat. No. 6,178,834.

(51) Int. Cl.$^7$ .............................................. A01M 17/00
(52) U.S. Cl. ..................................................... 73/865.8
(58) Field of Search ..................... 73/865.8; 340/573.1, 340/573.2; 43/141, 132.1, 107, 124

(56) References Cited

U.S. PATENT DOCUMENTS

| | | | |
|---|---|---|---|
| 5,778,596 A | * | 7/1998 | Henderson et al. |
| 5,832,658 A | * | 11/1998 | Randon |
| 5,899,018 A | * | 5/1999 | Gordon et al. |
| 5,927,001 A | * | 7/1999 | Ballard et al. |
| 5,953,855 A | * | 9/1999 | Edwards |

* cited by examiner

*Primary Examiner*—Robert Raevis
(74) *Attorney, Agent, or Firm*—Jackson Walker LLP

(57) ABSTRACT

A system for subterranean termite detection, measuring, concentration, collection, marking, tracking and suppression is provided by deploying a family of devices in the soil peripheral to objects subject to termite infestation. Each device is fitted with a signal port in its dorsal surface for inspectors to examine, and lateral ingress/egress ports for termites to enter. Subterranean termites are attracted to the devices, which are constructed of a termite food material. When entering termites seal the signal port they produce a distinctive visual change that is observable by an inspector from a distance. This alerts the inspector to the presence of termite activity within the device. The signal port may have an interior reflector for reflecting light directed threat to indicate that the signal port has been sealed by termites. The signal port may also have a mesh disposed thereacross to prevent unwanted obstruction thereof. Lateral ingress/egress ports may have a cellulose plug preventing organisms other than subterranean termites from entering. The food material of a given device may optionally be fitted with one or more chambers that are vacant or that contain separate food materials. The food material of the devices, and/or of the optional chambers, may be impregnated with toxicants that poison, growth regulators that induce desirable changes in, and /or markers detectable in, termites that feed thereon. When the optional chambers are left vacant they may serve as aggregation cavities for termite collection purposes, in which case a removable ventral plate permits withdrawal of termites contained therein.

17 Claims, 8 Drawing Sheets

METHOD AND APPARATUS FOR DETECTING, MEASURING, CONCENTRATING AND SUPPRESSING SUBTERRANEAN TERMITES

CROSS REFERENCE TO RELATED APPLICATIONS

This is a continuation-in-part of patent application Ser. No. 09/441,618 (now U.S. Pat. No. 6,189,393) filed Nov. 16, 1999, which is a continuation-in-part of patent application Ser. No. 09/434,091 (now U.S. Pat. No. 6,439,069) filed Nov. 5, 1999 which is a continuation-in-part of patent application Ser. No. 09/253,493 (now U.S. Pat. No. 6,178,893) filed Feb. 19, 1999.

FIELD OF THE INVENTION

This invention relates to a family of devices serving as termite detectors, concentrators and toxicant dispensers. It also relates to a method of deploying such devices in concert as a means of detecting, measuring, concentrating, tracking and suppressing existing termite colonies and insuring effective suppression response within a monitored area in the event of future attacks by subterranean termites.

BACKGROUND OF THE INVENTION

The cyclodienes were banned from the field of termite control in 1987. This action left a significant void. No equivalent soil drench termiticides have since been discovered to replace them.

Homeowners and businesses in the United States of America annually spend in excess of $1.7 billion to combat termite infestations. However, the USA is not alone. Costs associated with termite damage are significant throughout the Americas, as well as in Africa, Europe, Asia, Australasia and Oceania.

Recent Termite Control Developments

To fill the void left by the cyclodienes, new approaches have been developed in the fields of termite detection, monitoring and baiting. Many of these focus on pinpointing active termites and feeding them small, measured amounts of termite-specific toxicants in tamper resistant bait servers. The object is to reduce the population of the termite colony to the point where it cannot infest entities of economic value.

Once termites have been successfully suppressed, the area is monitored indefinitely for new signs of active termites. If new signs are found, a new round of toxicant baiting is initiated.

Factors Affecting Cost and Efficacy These new approaches, though potentially effective, cost much more than the older methodologies they replace. This happens because they are labor-intensive, and require highly skilled technicians. In many cases the demonstrated success rates of these approaches have been unusually disappointing, in terms of the time required to achieve suppression of active termites. Such failures are often linked to poor training, neglect, and user-unfriendly methods and devices.

Human Factors

The performance of labor-intensive, repetitive operations varies based on the nature of their accompanying psychological and physiological rewards and detractors. Positive rewards lead to improvements in performance. Negative detractors lead to performance degradation.

Even in areas actively foraged by subterranean termites, only a small fraction of prior art termite detectors become infested. Despite this, inspections of these devices must be performed carefully and consistently. Inspection of prior art detectors requires intellectual attention to detail and physical articulation of major joints of the human musculoskeletal system.

Nearly 1 in 7 Americans is afflicted with arthritis, making this disease the number one cause of mobility limitation in the United States. Others are afflicted with forms of temporary or chronic mobility dysfunctions. Still others suffer from temporary or chronic attention deficits. Such persons are often employed in the Pest Control industry, including the field of termite inspection and control. Prior art termite detectors may prevent many of these persons from performing routine inspections of these devices at all. For others, they make it difficult or impossible to consistently inspect them with an appropriate attention to detail.

SUMMARY OF THE INVENTION

The present invention achieves technical advantages by taking advantage of certain instinctive behaviors of subterranean termites, and of simple visual faculties of human observers with a family of devices able to detect, measure, collect, track, and suppress subterranean termites according to the present invention. The inspection process for each member of this family requires few inspection skills and minimal articulation of the joints. The inspector passes over a defined inspection circuit and shines a flashlight into the signal ports of devices of the present invention. If a distinctive reflection is observed, the device is inactive; if not, termites have sealed it.

By placing these devices around a structure, as well as in proximity to other sources of cellulose in the vicinity, it becomes possible to not only discover the fact of termite activity, but to measure its intensity and track its movements as well. The interval of time that passes between initial placement of the devices and their sealing by termites is a measure of the vigor and population of the termites that are foraging at that location. The number of devices that become infested within a given distance of one another measures dispersion of that termite population.

Once devices of the present invention fitted to serve as detectors are found to contain active termites, they are left in place to serve as concentrators for termite activity. This assures a constancy of termite activity in that area. These devices are then supplemented with a device of the present invention that is fitted to serve as a toxicant dispenser. The latter device is placed proximate to the reporting detector. The toxicant dispenser is inspected in the same manner as the detector. However, the absence of a distinctive reflection from the toxicant dispenser informs the inspector that the toxicant has been depleted and requires additional supplementation. The inspector then places a fresh toxicant dispenser next to the depleted device.

This sequence continues until termites cease depleting the toxicant dispensers. This occurs when the termites have been successfully suppressed. At that time a fresh device fitted to serve as a termite detector is installed, bringing the detection-suppression process through a complete cycle.

Under certain circumstances it is desirable to inoculate foraging termites with a tracking material that can be detected when the termites are collected at another location. A device of the present invention is fitted with food material impregnated with the tracking material and is placed at a desired location within an active termite foraging zone. A second device of the instant invention fitted to serve as a collector is placed at a desired location in another active termite foraging zone. After the termites have depleted the tracking material they seal the signal port of the device, alerting the inspector that the tracking material is consumed. The collector at the other location is then removed from the ground and termites within it are withdrawn for analysis to determine if any of the tracking material from the first device is present in their bodies or in the fecal material they have deposited in the collector. If the tracking material is found, it can be inferred that the same termite colony is involved in both foraging areas. If not, two termite colonies are likely involved.

Areas that have achieved successful termite suppression are monitored continuously into the future. This insures prompt discovery of a rebound in termite activity, either as the result of resurgence of the suppressed colony or the introduction of anew one.

BRIEF DESCRIPTION OF THE DRAWINGS

Note that although these drawings show a specific number of features such as signal ports and other ports, lateral passageways, vertical cavities, vestibules, inoculation reservoirs, and the like, both the number of such features as well as their exact placement may easily be varied while remaining faithful to the essential design of the invention.

DETAILED DESCRIPTION OF THE PREFERRED EMBODIMENTS

Figure 1:
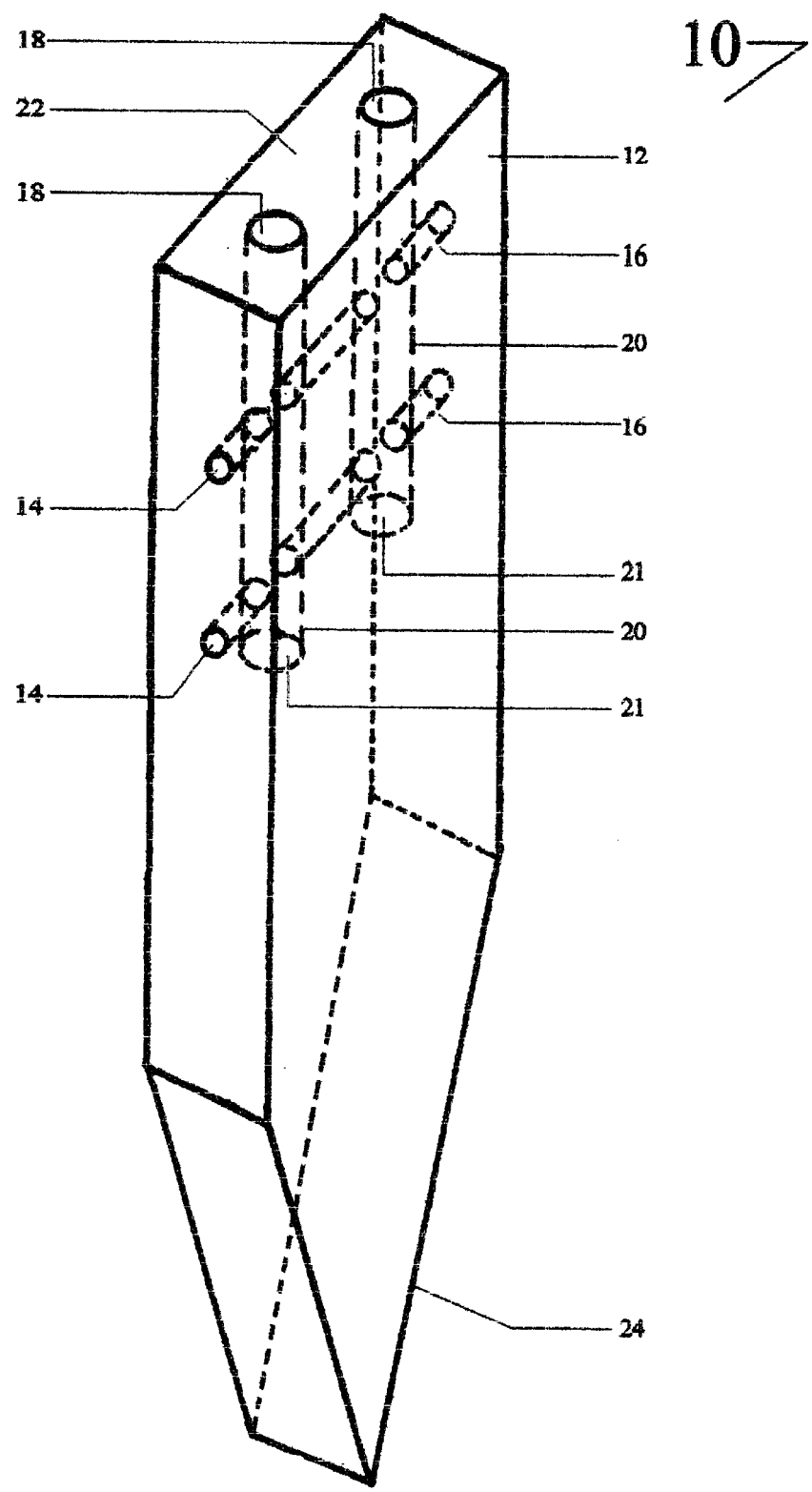
FIG. 1 is a perspective view of a device of the present invention with a plurality of signal ports and a plurality of lateral ingress/egress ports in communication with the signal ports via a plurality of lateral passageways.

FIG. 1 illustrates one embodiment of a device shown at 10 comprised of food material 12 such as wood. Food material 12 may or may not be impregnated with one or more materials that mark and/or poison termites feeding thereon. Food material 12 has a plurality of lateral ingress/egress ports 14 into lateral passageways 16. A plurality of upper signal ports 18 communicate with ingress/egress ports 14 via vertical cavities 20 and lateral passageways 16.

Device 10 has a tapered lower tip 24 adapted to be inserted into the soil. After insertion, most or all of lateral ingress/egress ports 14 are submerged beneath the surface of the soil. Furthermore, dorsal surface 22 is positioned slightly above the surface of the soil such that signal ports 18 are visible to a human observer passing by the detector.

A discernible contrast exists between dorsal surface 22 and the vertical cavities 20 below the open signal port 18. This contrast permits a human observer to ascertain whether signal ports 18 are sealed. The diameter of signal ports 18 allows visual inspection of device 10 from a standing or seated position in the process of a brisk circuit around the monitored perimeter.

When device 10 is inserted into soil containing subterranean termites, one or more said termites will contact it. When a termite explores ingress/egress port 14 it will often proceed into passageway 16 because the latter's architecture and dimensions resemble structures termites construct in wooden objects they feed upon.

On entering lateral passageway 16 the termite is led to the nearest interconnecting vertical cavity 20 and subsequently discovers the plurality of lateral passageways 16 and signal port 18. The open signal port 18 exposes the termite to predation and moisture loss, stimulating an instinctive behavior resulting in construction of a seal over the exposed aperture.

The sealed signal port 18 conveys a markedly different visual impression than an open signal port 18 to a human observer passing near device 10. When an inspector recognizes that one or several signal ports 18 in device 10 is sealed, the location of the device is recorded and the inspection circuit resumes.

If food material 12 is impregnated with a toxicant, device 10 serves both as a detector and toxicant dispenser. If food material 12 is impregnated with a marker, such as a dye, device 10 further serves as a termite-tracking device.

Figure 2:
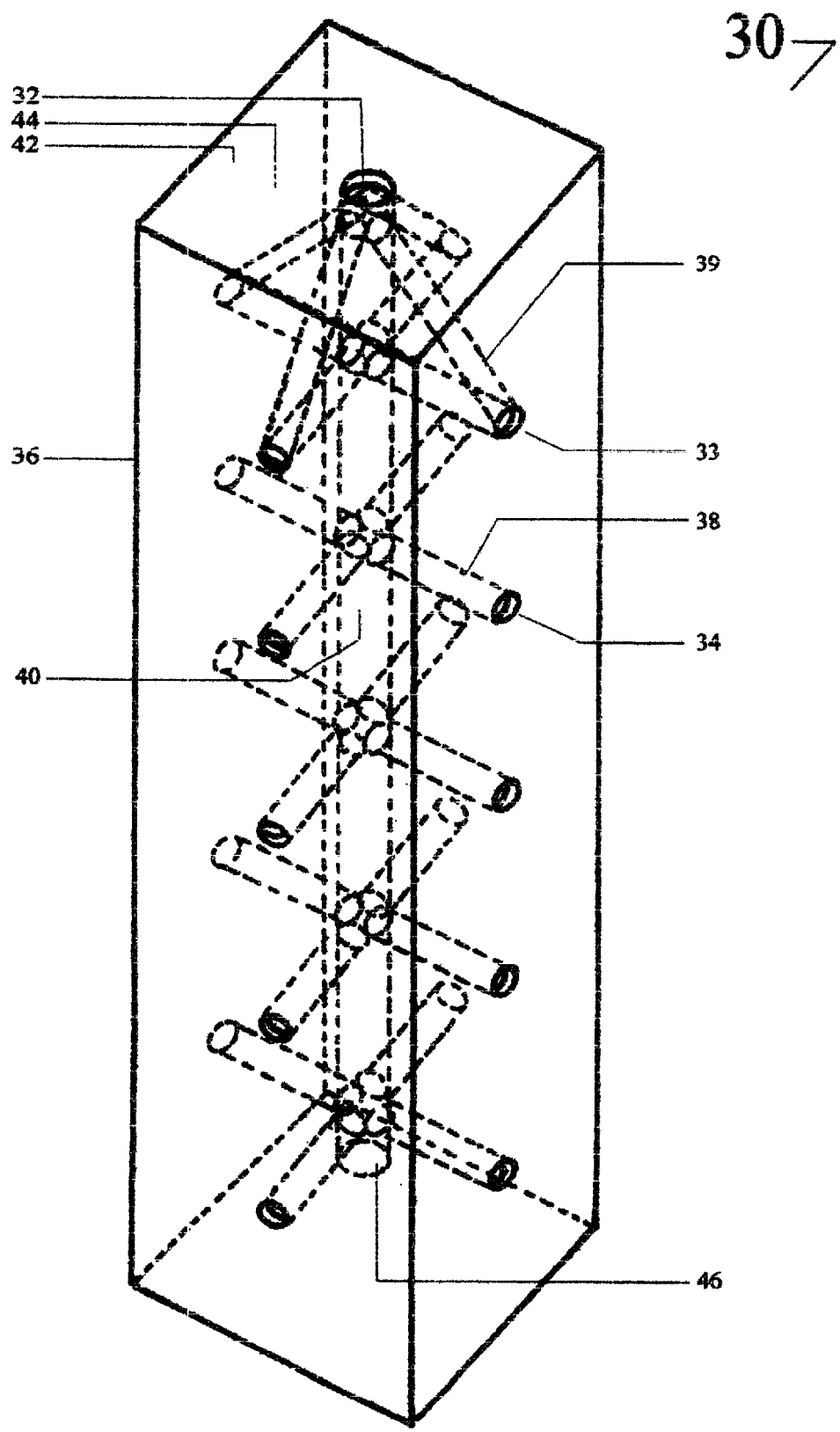
FIG. 2 is a perspective view of a device of the present invention with a singular signal port, a plurality of lateral ingress/egress ports in communication with the signal port via a plurality of lateral and oblique passageways, and having an external coating of corrosion-resistant termite impregnable material.

FIG. 2 illustrates another embodiment of a device of the present invention shown at 30. This differs from 10 in that it has a singular signal port 32. Further, it has a plurality of lateral ingress/egress ports 33 and 34, comprises of food material 44 which may or may not be impregnated with a toxicant and/or marker, and is coated with a hard corrosion resistant termite impregnable coating 36. Ingress/egress ports 33 and 34 provide access to a plurality of laterally extending passageways 38. These connect to vertical cavity 40 and signal port 32 dorsally, as well as lower extremity 46 ventrally. Lower extremity 46 may terminate within food material 44 or may penetrate the ventral surface of the detector exterior coating 36.

Optional oblique passageways 39 extend from ingress/egress ports 33 to the upper portion of vertical cavity 40. This feature may encourage certain termite species to seal signal port 32 at the dorsal surface of the detector. Although this element is not shown in FIGS. 3, 4, 5 or 6, it is an optional feature of each of the devices described therein.

The singularity of signal port 32 may simplify the inspection of 30. Increasing the number of ingress/egress ports 33 and 34 potentially reduces the time required for foraging termites, exploring the exterior surfaces of device 30, to find and enter an ingress/egress port 33 or 34. Coating 36 is light in color, or dark in color, as appropriate to insure a contrast with its normally lighter or darker surroundings, and further simplifying the inspection. Signal port 32, typically but not necessarily placed in the middle of the dorsal surface 42 of 30, contrasts sharply with the color of coated surface 36.

Coating 36 covers all external surfaces of 30, preventing feeding on those surfaces. Termites must enter 30 via one of the ingress/egress ports 33 or 34 in order to feed on food material 44, thus facilitating detection. Coating 36 also extends the life of 30 by preventing fungi and mildew from attacking food material 44 at its external surfaces.

Figure 3:
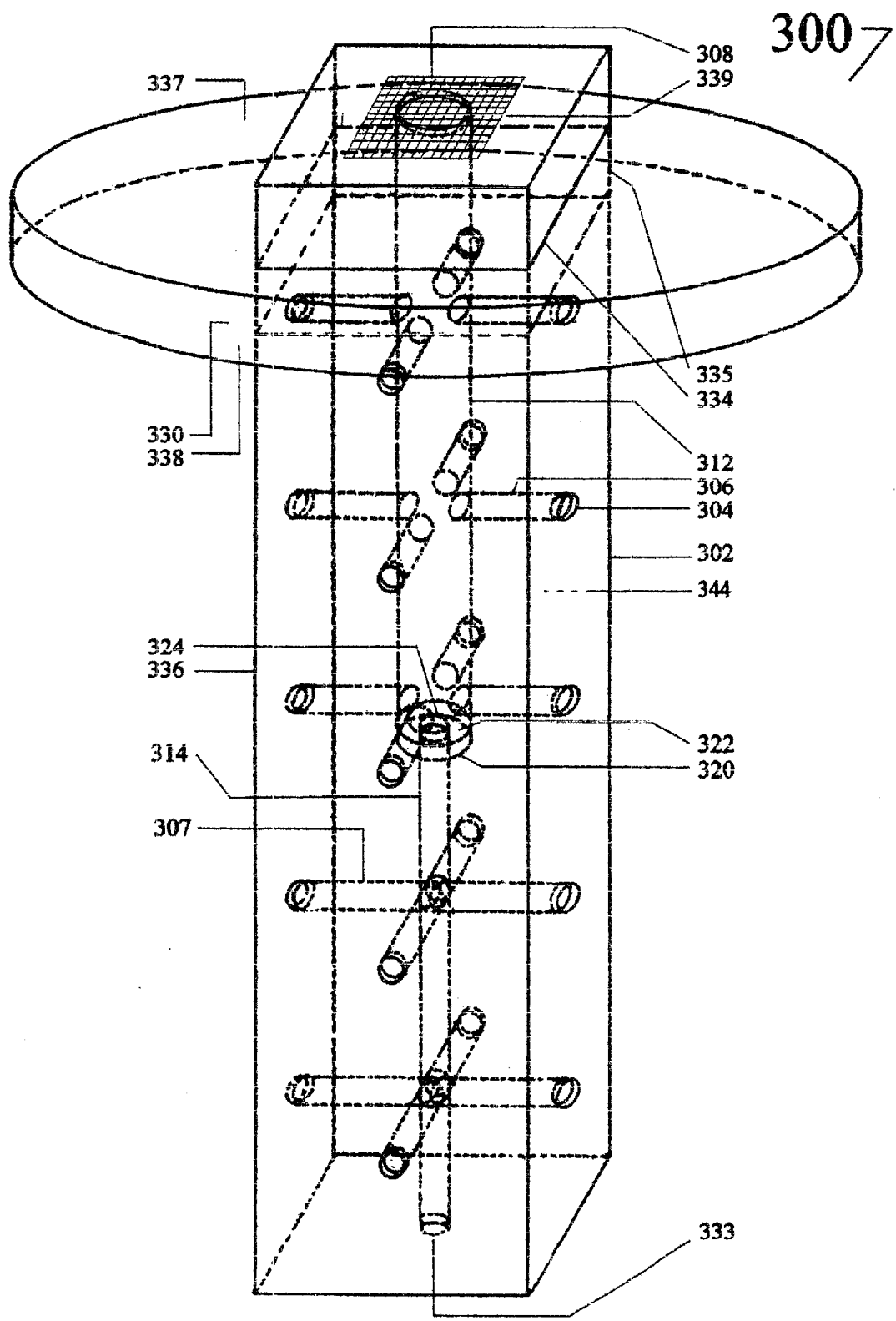
FIG. 3 is a perspective view of a device of the present invention with a singular signal port, a plurality of lateral ingress/egress ports in communication with the signal port via a plurality of lateral passageways, having an external corrosion-resistant termite impregnable coating, a central vertical cavity of large upper diameter and narrow lower diameter, the latter penetrating the ventral surface to form a drain port, a reflective disk positioned at the junction between the two sections of the vertical cavity, a screen covering the signal port, and an adjustable insulating collar annularly attached to the detector's shaft.

FIG. 3 illustrates a further embodiment of a device of the present invention shown at 300. It differs from 30 in that it has a multi-diameter vertical cavity comprising two parts, an upper portion 312 having a greater diameter, and a lower portion 314 having a smaller diameter. This embodiment incorporates interior reflective disk 322, exterior collar 330, and dorsal screen 339.

Device 300 has a singular signal port 308, a plurality of lateral passageway ports 304, giving access to upper lateral passageway 306 and lower lateral passageway 307, comprises of food material, 344 that may or may not be impregnated with a toxicant and/or marker, and is coated with a corrosion resistant termite impregnable coating 302.

Reflective disk 322 has a reflective upper surface, such as being mirrored, chromed, or comprised of other reflective material. By directing a flashlight or some other source of light into signal port 308 and thence into vertical cavity 312 the inspector immediately ascertains whether signal port 308 has been sealed, on the basis of observing or failing to observe a reflection from reflective disk 322.

Dorsal screen 339 Covers signal port 308, being glued to the dorsal surface of the detector 300 and effectively preventing the introduction of unwanted debris and/or undesirable organisms into vertical passageway 312. Dorsal screen 339 efficiently excludes the introduction of undesirable organisms and/or objects, yet permits light and a conspicuous exchange of gases and moisture.

The junction between vertical passageway 312 and vertical passageway 314 produces an annular support surface or ledge 320 on which reflective disk 322 rests. Aperture 324 in the center of reflective disk 322 permits termites to move freely from one vertical cavity to the other and allows effluent to pass. Lower vertical cavity 314 penetrates the ventral surface of 300 at its distal extremity, producing ventral aperture 333.

Annular collar 330 is frictionally attached and its position along the length of shaft 336 is adjustable. Collar 330 increases the size of the visible dorsal surface area of 300, making it more easily seen by an inspector and reducing the likelihood that vegetation will envelope land obscure it between inspections. By constructing the collar 330 of an insulating material such as polyolefin foam, collar 330 dramatically reduces diurnal and seasonal variations in temperature in the soil immediately adjacent to 300. This moderating effect makes the soil more hospitable to foraging termites and speeds up the detection process.

By pressing central aperture 334 of collar 330 onto the shaft 336 of 300, surfaces 335 of collar 330 will immediately exert a constant and persistent pressure against said shaft. This assures said collar will remain affixed to shaft 336 despite the action of naturally occurring phenomena such as wind, rain and water flow, snow, ice, and any natural movement of the soil associated with such phenomena. Additionally, this pressure will also prevent removal of collar 330 by other phenomena such as the suction produced by a lawnmower passing over 300.

Collar 330 allows shaft 336 to be inserted into soil before the collar is affixed. This facilitates an intimate mating of the surfaces of 300 with surrounding soil, conducive to the foraging of termites, even in the presence of an uncooperative native soil.

Figure 4:
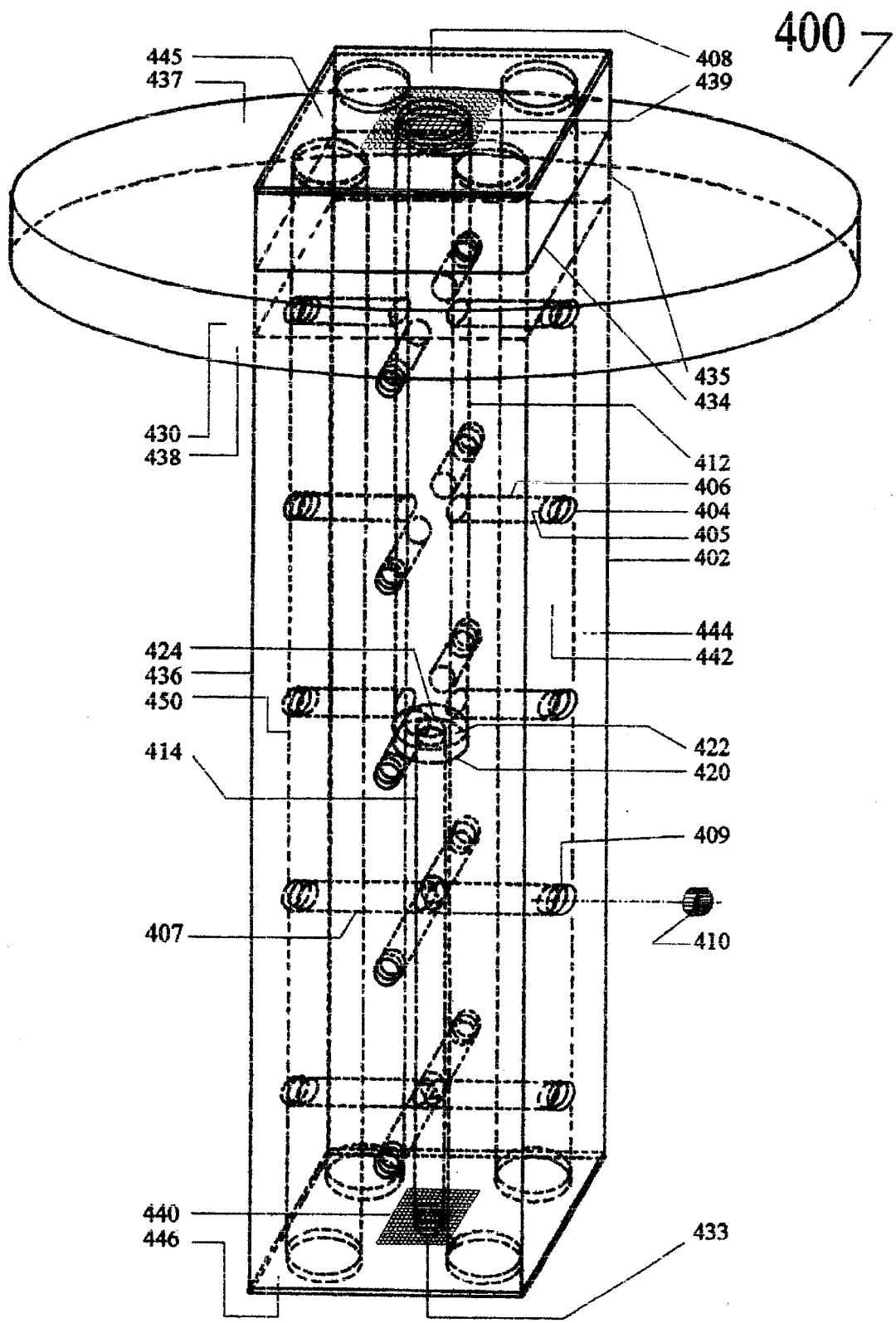
FIG. 4 is a perspective view of the device of FIG. 3, with a screen covering the ventral drain port, vestibules in the proximal ends of each lateral passageway, cellulose plugs inserted into the aforesaid vestibules, and a plurality of optional inoculation cavities parallel with the central vertical cavities.

FIG. 4 illustrates a further embodiment of a device of the present invention shown at 400. It differs from 300 in that the proximal ends of each lateral passageway 406 and 407 are fitted with vestibule 409 containing cellulose plug 410. Additionally, food material 444 is fitted with a plurality of optional inoculation reservoirs 450.

Vestibule 409 widens the proximal end of lateral passageways 406 and 407 to allow a plurality of termites to enter vestibule port 404 simultaneously. Cellulose plug 410 is comprised of a processed cellulose disk pressed into the form of a bucket that lines vestibule 409 to exclude non-xylophagous organisms from entering lateral passageway port 405.

Food material 444 may or may not be impregnated with a toxin and/or marker. Optional inoculation reservoir 450, if present, may comprise cavities or may be filled with a material 442 separate and distinct from food 444, and said material 442 may or may not be impregnated with a toxin and/or marker. The arrangement of inoculation reservoir 450 in 400 is such that termites only gain access to it by consuming food material 444 and thus excavating a new passageway into each inoculation reservoir 450.

Figure 5:
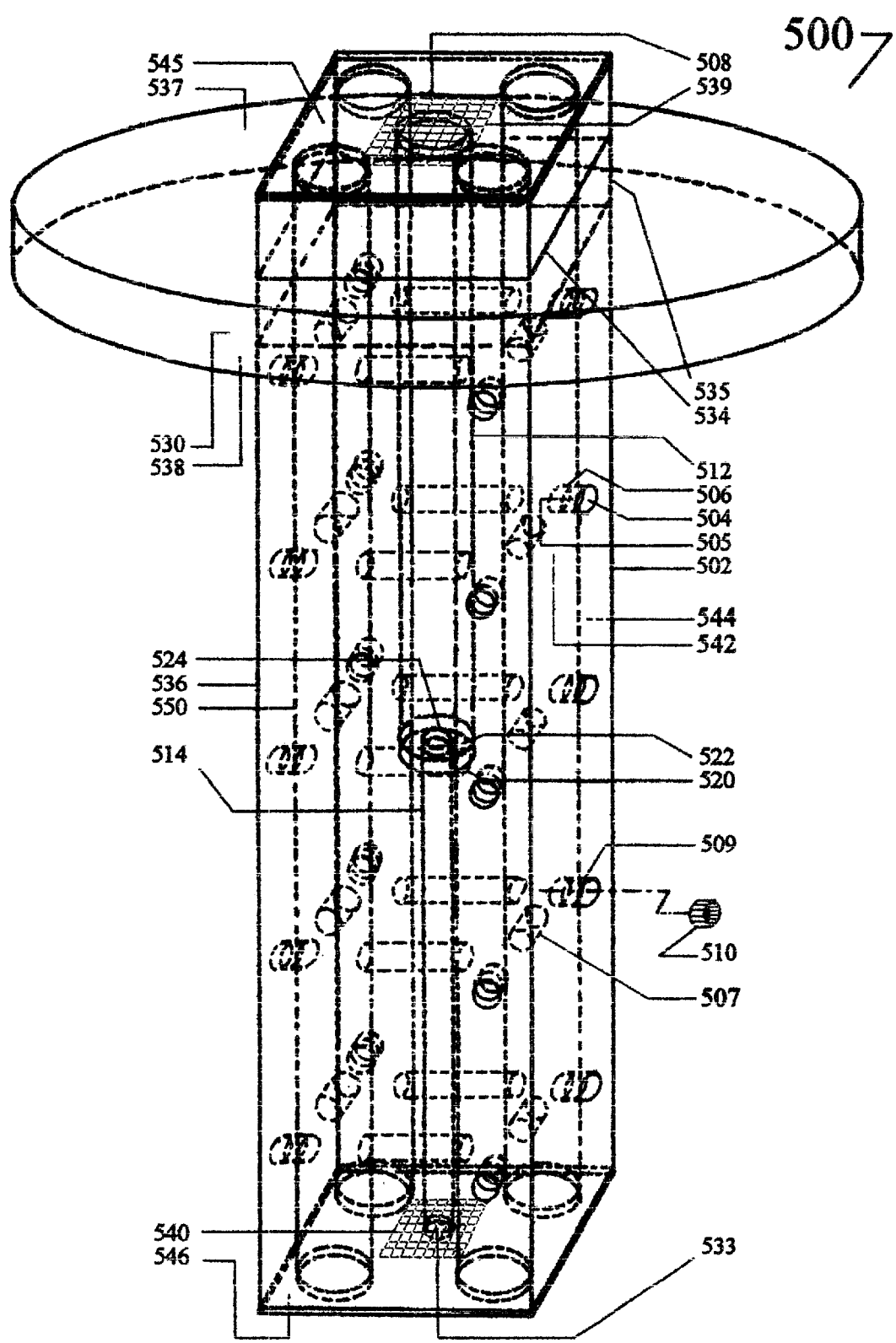
FIG. 5 is a perspective view of the device of FIG. 4, absent the lateral passageways communicating with the central vertical cavities, but having a plurality of lateral toxicant passageways in communication with a plurality of inoculation cavities, with vestibules in the proximal ends of each toxicant passageway, and cellulose plugs inserted into the aforesaid vestibules.

FIG. 5 illustrates a further embodiment of a device of the present invention shown at 500. It differs from 400 in the absence of a lateral passageway connecting vertical cavities 512 and 514 with exterior surface 536, and the addition of a plurality of lateral passageways 506 and vestibules 509 communicating between exterior surface 536 and a plurality of inoculation reservoirs 550.

Vestibule 509 widens the proximal end of lateral passageway 506, as in 400, and is fitted with cellulose plug 510 to exclude non-xylophagous organisms from entering lateral passageway port 505. This arrangement is such that termites gain access to inoculation reservoir 550 first. Inoculation reservoirs 550 are conjoined by intermediate lateral passageways 507, so that once the food material 542 of one reservoir 550 is depleted the termites will immediately enter another reservoir 550 to consume food material 542 therein until all such food material 542 in 500 has been depleted. If food material 542 is more easily masticated than that of food material 544, and equally or more attractive to termites for food, food material 542 will be entirely consumed before the termites commence to consume food material 544. After termites begin consuming food material 544, they finally gain access to vertical cavities 512 and 514 and seal signal port 508. An inspector unable to illuminate reflective disk 522 is thereby informed that the toxin and/or marker contents of inoculation reservoirs 550 has been depleted and a fresh device 500 fitted to serve as a toxicant dispenser and/or marker should be placed proximate to it.

Figure 6:
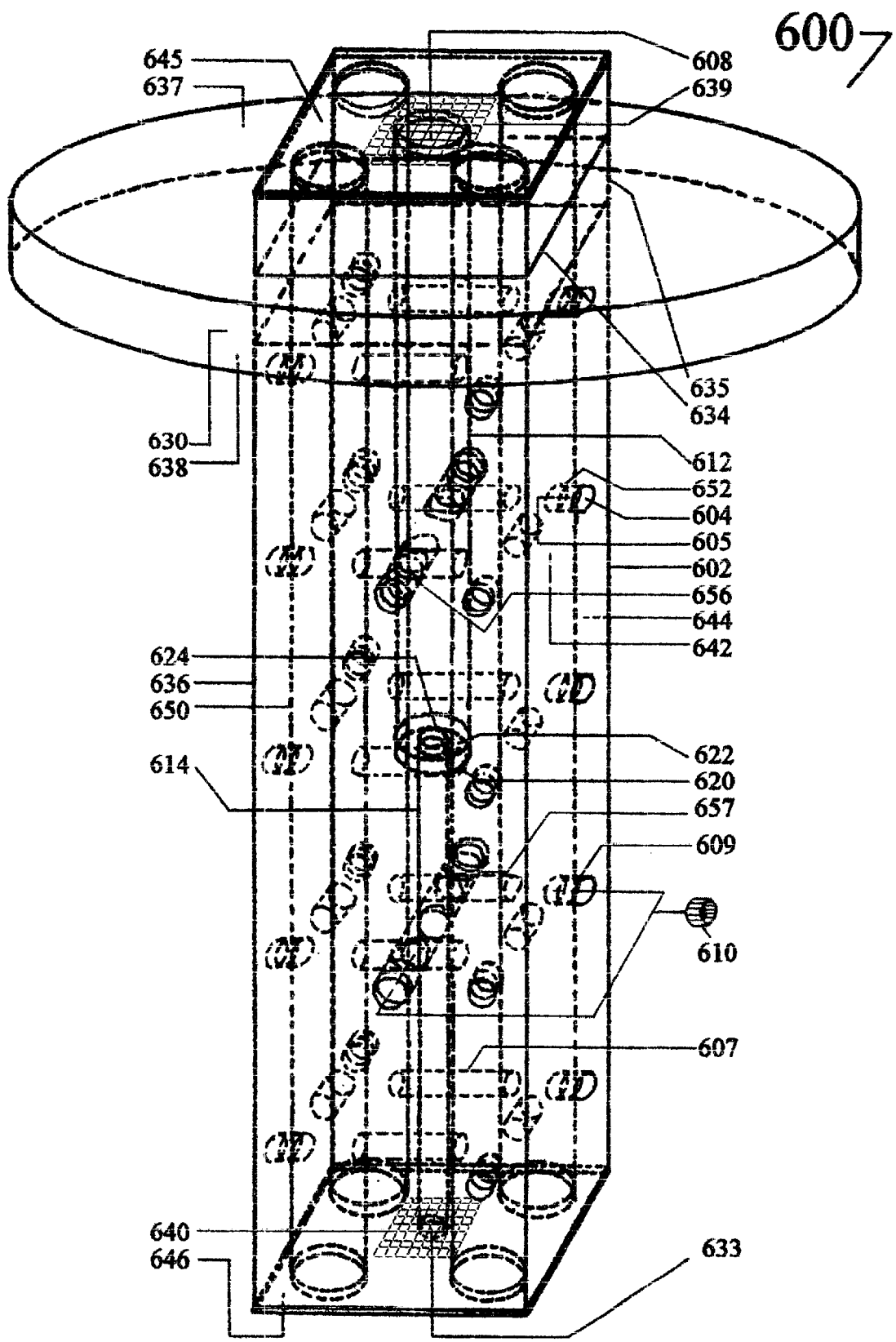
FIG. 6 is a perspective view of a device of the present invention having all the elements of FIG. 5, and including one set of upper lateral passageways in communication with one set of lateral toxicant passageways and the upper vertical cavity, and one set of lower lateral passageways in communication with one set of lateral toxicant passageways and the lower vertical cavity, and having a removable ventral plate.

FIG. 6 is a perspective view of a device of the present invention at 600. It has all the elements of FIG. 5. Additionally, it includes one set of upper lateral passageways 656 that communicate between the collection passageways 607 and the upper vertical cavity 612, and one set of lower lateral passageways 605 that communicate between collection passageways 607 and lower vertical cavity 614. A removable ventral plate 646 allows an inspector to expose collection chambers 642, which are contained within food material 644 but are not filled with additional food material and therefore will serve to aggregate termites in relatively large numbers. Once these chambers are exposed, the termites congregating therein may be removed for analysis by, for example, tapping against a hard surface.

Figure 7:
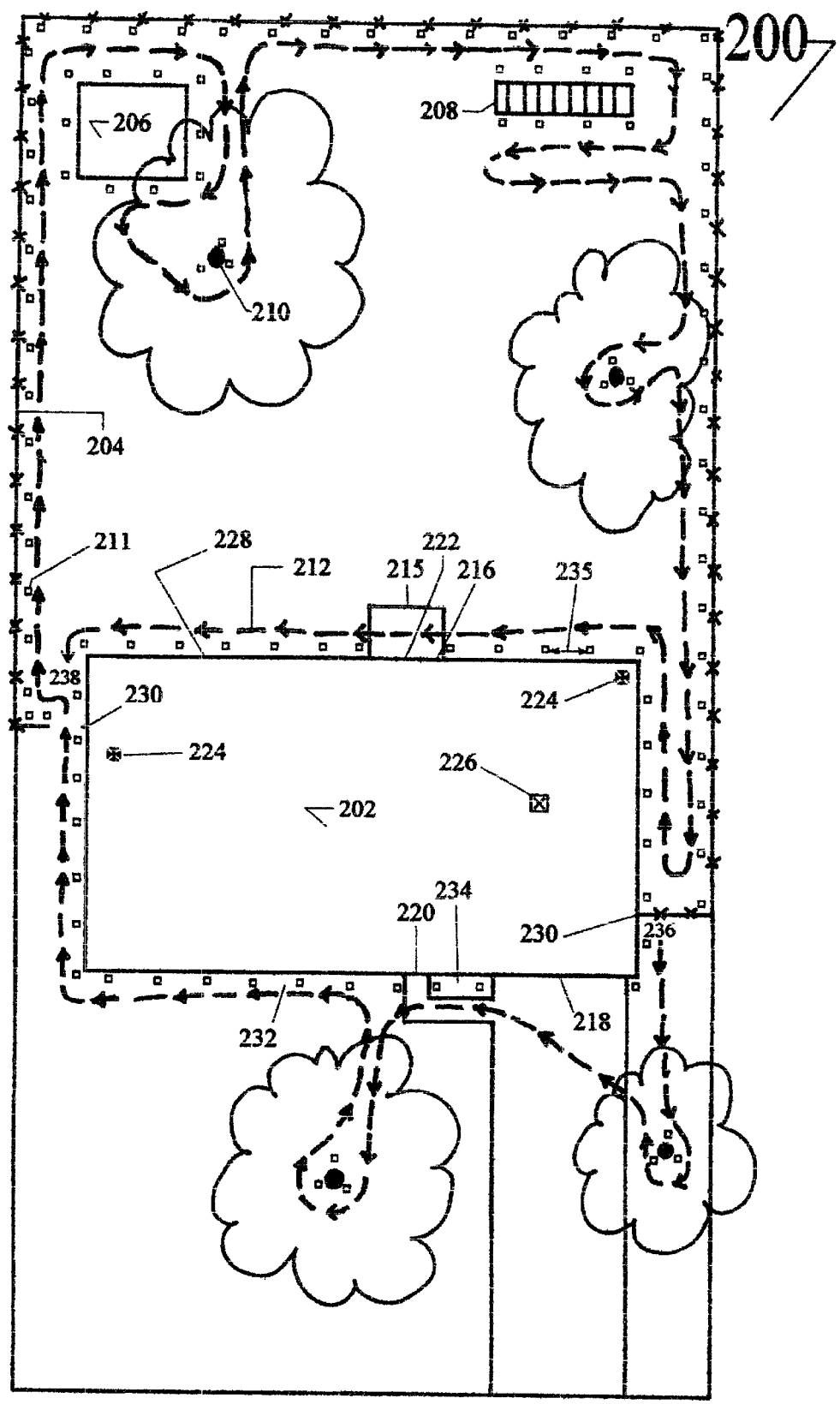
FIG. 7 is a plan view of a hypothetical residential plot containing a residential structure, a wood privacy fence, a detached shed, a wood pile, and several trees, around which devices of the present invention have been placed in accordance with instructions provided herein for a measured monitoring program.

FIG. 7 illustrates a hypothetical suburban homestead 200, comprising a single family residential structure 202 with shed 206, woodpile 208, wooden privacy fence 204, and a plurality of trees 210. A plurality of devices 211 of the present invention fitted to serve as termite detectors and preferably following the design of FIG. 4 shown at 400 are placed at specific intervals along the perimeter of each of the above structures to form a monitored perimeter that: may be inspected by passing along inspection circuit 212. The beginning of inspection circuit 212 is arbitrarily selected to be at 236, thence following a pathway that takes the inspector past all devices 211, and finally terminating at 238.

The arrangement depicted in 200 is intended to provide measured monitoring of the homestead. By placing devices 211 around all elements that are at risk of termite infestation, and using a relatively close placement interval 235, preferably in the range of 5 ft. in length, the ensuing inspection process is enabled to collect information bearing on vigor, population size, and; dispersion of the termites foraging in the soil at the homestead, including determining the number and foraging zones of separate and distinct termite colonies that are foraging in this soil.

Figure 8:
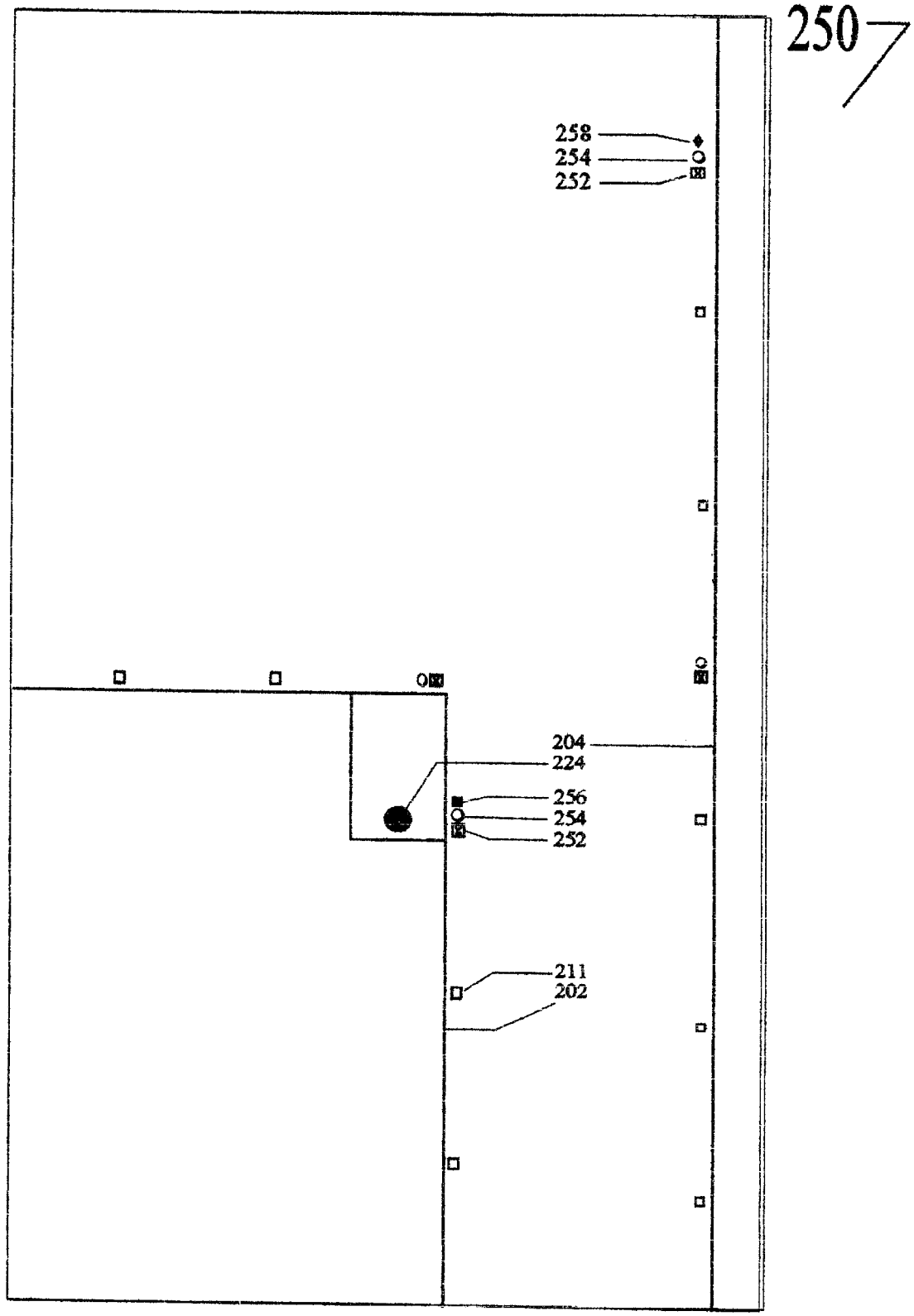
FIG. 8 is a plan view of a selected portion of the hypothetical residential plot of FIG. 7, in which several of the aforementioned devices have detected the presence of termites, showing the positioning of additional devices of the present invention in accordance with instructions provided herein for response to the detection of termite activity at a site previously provided with a measured monitoring program.

FIG. 8 is a plan view of a selected portion of the homestead depicted in FIG. 7. Four devices 252, initially installed as devices 211 fitted to serve as detectors, have become infested with termites. The time between installation and infestation has been recorded for each device, to correlate with other information as an indication of the vigor and size of the infesting termite colony.

Next to each device 252 has been placed a device 254 fitted to serve as a toxicant dispenser, preferably following the design of FIG. 5 shown at 500. The device 252 will remain in place to serve as an aggregation point for termite activity, assuring active termite foragers in its vicinity and speeding infestation of the newly placed device 254. This device 254 will be inspected regularly to determine its status. When the toxicant in a given device 254 has been substantially depleted, termites will enter its vertical cavity and seal the signal port, alerting the inspector to supplement it with an additional device 254.

If the device 254 is consistently depleted on each inspection, a large and/or vigorous termite colony is indicated. In such a case, it is advisable to shorten the inspection interval, and/or increase the number of device 254 placements made on each inspection visit. This process is continued until the termites are suppressed, at which time they will fail to seal the signal port of device 254. When this occurs, device 254 is left in place to serve as a detection device for the next three months. If, after that period has elapsed, its signal port remains unsealed, a fresh device 211 fitted to serve as a detector is placed next to it. All devices 252 and 254 with sealed signal ports are left in the ground to serve as aggregation points for termites. They are removed and discarded only when their internal structure collapses due to termite activity of damage by fungi.

Additionally, next: to the device 254 that is proximate the bath trap 224 has been placed a device 256, fitted with a tracking material, such as cellulose impregnated with Sudan Red 7B dye, and preferably following the design of FIG. 5 shown at 500. Once consumed, this material remains in the gut of the termite for some time, and can be observed by the naked eye during examinations of live termite specimens. Other tracking materials may also be suitable for this purpose. In the example shown in FIG. 8, it is desired to determine if the termites foraging in the soil where device 256 has been placed are from the same colony foraging at the fence line in the upper right portion of the figure.

In order to answer this question, a device 258 fitted to serve as a collector and preferably following the design of FIG. 6 at 600 is placed next to the device 254 at the fence line at the same time the device 256 is placed proximal to the bath trap 224. When termites have substantially depleted the tracking material in device 256, they enter its vertical cavity and seal the signal port, alerting the inspector to obtain live specimen termites from the remotely located device 258. The device 258 is removed from the soil and the termites within it are removed and placed in a specimen container for analysis.

If at least one of these termites is found to be stained with red dye, it may safely be inferred that the termites infesting both locations are members of the same termite colony. If a reasonable number of termite specimens, say 100 or more, has been collected, and none of these termites is so stained, it may be inferred that two separate and distinct termite colonies are involved. The existence of two colonies means that toxicants must be administered separately to both of them. Otherwise, the untreated colony may take over the territory of the treated colony and cause an immediate resurgence of termite activity at that location shortly after the treated colony has been successfully suppressed.

FIELD VALIDATION OF THE PRESENT INVENTION

The present invention is the culmination of research spanning a number of years. Shortly after the cyclodienes were banned the inventor initiated what eventually became an intensive survey of scientific tracts on termite biology. This survey was supplemented with field observations at over 60 sites throughout the state of Texas. Live termite specimens were collected at these sites and removed to the inventor's laboratory for further study. In the process, over 75 live cultures of subterranean termites, representing five different termite species, were assembled in separate, sealed containers. This research was educational, but did not immediately focus on specific treatment strategies.

When the first termite baits became available, the inventor began to seek new ways to determine where termites were foraging in the soil around structures. Within two years, over 7,000 wooden survey stakes were placed at sites in Texas in an attempt to map termite foraging patterns. This project became very time consuming due to inefficiencies inherent to the method in use. In order to speed inspections, various stratagems and designs were tested to find a way to perform non-invasive examinations of the survey stakes. One approach that showed promise involved drilling a visible vertical hole, communicating with a submerged horizontal hole, in each stake. Termites entering the horizontal hole would seal the vertical hole with soil detritus, signaling their presence in the exposed top of the stake.

Certain termite colonies were observed to linger on the exterior of the stake before entering the horizontal hole. This suggested the stake should be coated to prevent exterior feeding. After researching and field testing a number of candidates, a durable material resistant to corrosion and non-repellant to termites was selected. Stakes placed in the field coated with this material exceeded expectations and exhibited unexpected benefits. The coating made the stake easier to inspect and protected the wood of the stake, extending its life.

Continued experimentation with various shapes and designs eventually produced the family of devices described in the present application. Testing of these designs continues at sites in Texas, Louisiana, and Florida, and involves as a minimum the five distinct species of termites Coptotermes formosanus, Reticulitermes flavipes, R. hageni, R. virginicus, and R. tibialis. This testing is being conducted by the inventor as well as by independent firms and research groups who have entered into confidentiality agreements with the inventor.

For example, Texas A&M University, at College Station, Texas, has been testing 20 prototypes of FIG. 3, absent dorsal screen 339, since Nov. 1, 1999. These devices were placed in two test sites along with equal numbers of (1) a commercially available in-ground termite detector and (2) a wooden termite collector that has been used by Texas A&M University for a number of years to conduct field research. Data supplied by Texas A&M University to the inventor on Feb. 12, 2000 show that, after approximately 15 weeks of testing, 25% of the devices of the present invention had confirmed infestations by subterranean termites as of Feb. 11, 2000 and, on each inspection event, an average of 11.5% of these devices had been found to report termite activity.

None of the devices of the two other designs presently shows signs of active termites, despite the fact that they are all placed proximate to one another and their placement occurred on the same date. The Texas A&M collector has never shown active termites, while the commercial detector reported active termites only twice, or less than 1% of the time over the life of test.

Additional testing is planned for the current year at sites in Georgia, Alabama, Mississippi, South Carolina, Arizona and California.

I claim:

1. A detector, comprising;
a body member having an upper body opening and comprised of a bait material attractive to wood destroying insects, said body member having a vertically extending detector cavity extending from said upper body opening, further having at least one lateral ingress/egress port in communication with said vertically extending detector cavity, and further comprising a cellulose plug disposed across said ingress/egress port.

2. The detector as specified in claim 1 wherein said vertically extending detector cavity has an upper portion having a first diameter, and a lower portion having a second diameter, said upper portion first diameter being greater than the second diameter of said lower portion.

3. The detector as specified in claim 2 wherein reflective material is disposed upon a transition portion defined between said detector cavity upper portion and said detector cavity lower portion.

4. The detector as specified in claim 3 wherein said reflective material comprises a reflective disk having an opening extending therethrough, said opening of said disk having a diameter commensurate with the diameter of the lower portion of the vertically extending detector cavity.

5. The detector as specified in claim 1 further comprising a mesh disposed across said upper body opening.

6. The detector as specified in claim 1 wherein said body member comprises a plurality of lateral ingress/egress ports each in communication with said vertically extending detector cavity.

7. The detector as specified in claim 1 further comprising a collar adapted about said body member.

8. The detector as specified in claim 7 wherein said collar is adapted to be selectively adjustable along a length of said body member.

9. The detector as specified in claim 1 further comprising a termite impregnable coating being disposed about said body member.

10. A detector, comprising;
a body member having an upper body opening and comprised of a bait material attractive to wood destroying insects, said body member having a vertically extending detector cavity extending from said upper body opening, and further comprising at least one vertically extending inoculation cavity being spaced from said detector cavity and opening to an upper inoculator opening.

11. The detector as specified in claim 10 further comprising a toxicant disposed within inoculation cavity.

12. The detector as specified in claim 10 further comprising a tracking material disposed within said inoculation cavity, wherein said tracking material is identifiable in the bodies or fecal material of termites.

13. The detector as specified in claim 10 further comprising a first passageway extending between said detector cavity and said inoculation cavity.

14. The detector as specified in claim 13 further comprising a second passageway extending between said detector cavity and an exterior of said body member.

15. The detector as specified in claim 10 further comprising a cap selectively detachable from said body member to expose ends of said detector cavity and said inoculation cavity opposite said respective upper openings and collect dead termites therefrom.

16. A method of detecting the presence of subterranean termites using a detector having a body member having an upper opening and comprised of a bait material attractive to the wood destroying insects, said body member having a detectable substance different from said bait material, comprising steps of:
disposing the body member into soil; and
detecting the presence of said substance in fecal material or termite bodies to identify which detector said termite visited.

17. A detector, comprising;
a body member having an upper body opening and comprised of a bait material attractive to wood destroying insects, said body member having a vertically extending detector cavity extending from said upper body opening, wherein said body member is impregnated with a chemical absorbable by a termite and detectable in fecal material of a termite when consumed thereby.

* * * * *